US009834269B2

(12) United States Patent
Hagimoto et al.

(10) Patent No.: US 9,834,269 B2
(45) Date of Patent: Dec. 5, 2017

(54) TRAVELING WIND INTAKE STRUCTURE FOR SADDLED VEHICLE

(71) Applicant: HONDA MOTOR CO., LTD., Tokyo (JP)

(72) Inventors: Masashi Hagimoto, Wako (JP); Nobutaka Wakita, Wako (JP); Atsushi Kusuda, Wako (JP); Kihoko Kaita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/079,806

(22) Filed: Mar. 24, 2016

(65) Prior Publication Data

US 2016/0288854 A1  Oct. 6, 2016

(30) Foreign Application Priority Data

Mar. 30, 2015 (JP) .................................. 2015-070153

(51) Int. Cl.
*B62J 17/04* (2006.01)
(52) U.S. Cl.
CPC .................................... *B62J 17/04* (2013.01)
(58) Field of Classification Search
CPC ........................................................ B62J 17/04
USPC ....................................................... 296/78.1
See application file for complete search history.

(56) References Cited

U.S. PATENT DOCUMENTS

| 4,249,626 | A | * | 2/1981 | Fields | ................. F28D 1/05383 165/47 |
|---|---|---|---|---|---|
| 4,557,345 | A | * | 12/1985 | Hamane | .................... B62J 17/00 180/229 |
| 4,564,081 | A | * | 1/1986 | Hamane | ...................... B62J 7/00 180/229 |
| 6,979,039 | B2 | * | 12/2005 | Takemura | ................ B62J 17/04 296/78.1 |
| 9,334,005 | B2 | * | 5/2016 | Horiuchi | .................. B62J 17/00 |
| 2002/0041107 | A1 | * | 4/2002 | Takemura | ................ B62J 17/04 296/78.1 |

(Continued)

FOREIGN PATENT DOCUMENTS

| JP | 2001-10573 A | 1/2001 | |
|---|---|---|---|
| JP | 2002087355 A | * 3/2002 | .............. B62J 17/04 |

(Continued)

*Primary Examiner* — H Gutman
(74) *Attorney, Agent, or Firm* — Westerman, Hattori, Daniels & Adrian, LLP

(57) ABSTRACT

A traveling wind intake structure for a saddled vehicle, comprising a meter visor covering a meter from above; and a wind screen covering the meter visor from above, wherein an introduction portion for introducing a traveling wind rearward of the wind screen is formed between a lower end of the wind screen and a vehicle body, a gate-type louver member is provided between the wind screen and the meter visor, and is formed by a plate-shaped guide member for guiding rearward the traveling wind introduced through the introduction portion, and leg members extending downward from left and right end portions of the guide member in a vehicle width direction, and the leg members are each provided with a shaft portion extending along the vehicle width direction and supporting the louver member in a frontward and rearward swingable manner.

11 Claims, 9 Drawing Sheets

(56) References Cited

U.S. PATENT DOCUMENTS

| | | | | |
|---|---|---|---|---|
| 2009/0189413 A1* | 7/2009 | Misaki | ................... | B62J 17/04 296/180.1 |
| 2009/0195011 A1* | 8/2009 | Tsuda | ...................... | B62J 17/04 296/78.1 |
| 2013/0249239 A1* | 9/2013 | Yokouchi | ................ | B62J 17/00 296/180.1 |
| 2014/0159426 A1* | 6/2014 | Takahashi | ................ | B62J 17/04 296/192 |

FOREIGN PATENT DOCUMENTS

| | | | | |
|---|---|---|---|---|
| JP | 3807218 B2 * | 8/2006 | ............. | B62J 17/04 |
| JP | 2007045283 A * | 2/2007 | ............. | B62J 17/04 |
| JP | EP 2168856 A2 * | 3/2010 | ............. | B62J 17/02 |
| JP | EP 2374700 A1 * | 10/2011 | ............. | B62J 17/04 |
| JP | 2014-113988 A | 6/2014 | | |
| JP | EP 3002190 A1 * | 4/2016 | ............. | B62J 17/04 |
| JP | EP 3059149 A1 * | 8/2016 | ............. | B62J 17/02 |

* cited by examiner

TRAVELING WIND INTAKE STRUCTURE FOR SADDLED VEHICLE

The present application relates to a traveling wind intake structure for a saddled vehicle.

BACKGROUND OF THE INVENTION

Heretofore, a traveling wind intake structure for a saddled vehicle has been disclosed for example in Japanese Patent Application Publication No. 2001-10573 (JP '573) and Japanese Patent Application Publication No. 2014-113988 (JP '988). JP '573 discloses a structure in which a wind screen covering a meter visor from above is provided in a vehicle front portion, an inlet port for a traveling wind is formed in a lower portion of the wind screen, and a baffle plate portion for guiding upwardly rearward the traveling wind introduced through the inlet port is formed in front of the meter visor. JP '988 discloses that a wind introduction portion is formed in a front portion of a vehicle body cover, and an inner wind passage through which part of a traveling wind taken into an inside of the vehicle body cover through the wind introduction portion is guided to a wind discharge port is formed within the vehicle body cover.

SUMMARY OF THE INVENTION

The structure in which the baffle plate portion is formed in front of the meter visor has a problem as given below. Specifically, in the case of a vehicle large in size, it is difficult to guide a traveling wind to a position lower than an upper surface of the meter visor, and accordingly the structure cannot efficiently guide the traveling wind toward a vehicle occupant adaptively to an occupant's riding position. Moreover, the structure in which the inner wind passage is formed within the vehicle body cover has a problem in that the vehicle body cover is prone to be complicated in its internal structure.

Therefore, one object of the present invention is to provide a traveling wind intake structure for a saddled vehicle, including a wind screen covering a meter visor from above, the structure being simple in construction and capable of efficiently guiding a traveling wind toward a vehicle occupant.

For the purpose of solving the above-mentioned problems, a first aspect of the present invention provides a traveling wind intake structure for a saddled vehicle, comprising: a meter visor (20) provided in a vehicle front portion and covering a meter (19) from above; and a wind screen (30) covering the meter visor (20) from above, in which an introduction portion (15) for introducing a traveling wind (W1) rearward of the wind screen (30) is formed between a lower end (30b) of the wind screen (30) and a vehicle body (10), a gate-type louver member (40) is provided between the wind screen (30) and the meter visor (20), and is formed by a plate-shaped guide member (41) for guiding rearward the traveling wind (W1) introduced through the introduction portion (15), and leg members (45) extending downward from left and right end portions of the guide member (41) in a vehicle width direction, and the leg members (45) are each provided with a shaft portion (47) extending along the vehicle width direction and supporting the louver member (40) in a frontward and rearward swingable manner.

A second aspect of the present invention provides the traveling wind intake structure for the saddled vehicle, in which the guide member (41) includes a wing portion (141) formed to extend toward an upstream side of the traveling wind (W1) introduced through the introduction portion (15) in a side view.

A third aspect of the present invention provides the traveling wind intake structure for the saddled vehicle, in which the wing portion (141) is formed by a first wing portion (142) located upstream of the traveling wind (W1) relative to the shaft portion (47) in the side view, and a second wing portion (143) which is continuous with the first wing portion (142) and is located downstream of the traveling wind (W1) relative to the shaft portion (47) in the side view. Then, in the side view, a length (J2) of the second wing portion (143) in a direction along an upper surface of the guide member (41) is less than a length (J1) of the first wing portion (142) in the direction.

A fourth aspect of the present invention provides the traveling wind intake structure for the saddled vehicle, in which the guide member (41) is formed by a first inclined portion (42) which is inclined to extend upwardly rearward in the side view, and a second inclined portion (43) which is continuous with a rear end (42r) of the first inclined portion (42) and is inclined to extend rearward or downward of the first inclined portion (42) in the side view.

A fifth aspect of the present invention provides the traveling wind intake structure for the saddled vehicle, in which when the louver member (40) swings rearward, a rear end (43r) of the second inclined portion (43) is located rearward of a rear end (20r) of the meter visor (20), and the second inclined portion (43) is inclined to extend downwardly rearward in the side view.

A sixth aspect of the present invention provides the traveling wind intake structure for the saddled vehicle, in which the leg member (45) is provided with a position restraining unit (49) configured to restrain the relative positions of the guide member (41) and the meter visor (20).

A seventh aspect of the present invention provides the traveling wind intake structure for the saddled vehicle, in which when the louver member (40) swings frontward, the position restraining unit (49) restrains the relative positions such that a front end (41f) of the guide member (41) is spaced from an upper surface (20u) of the meter visor (20).

An eighth aspect of the present invention provides the traveling wind intake structure for the saddled vehicle, further comprising a position adjusting unit (50) configured to allow the wind screen (30) to move up and down and configured to adjust the relative positions of the lower end (30b) of the wind screen (30) and the vehicle body (10).

A ninth aspect of the present invention provides the traveling wind intake structure for the saddled vehicle, in which when the wind screen (30) is moved upward, the lower end (30b) of the wind screen (30) is located downward of a lower end (41b) of the guide member (41) in the side view.

A tenth aspect of the present invention provides the traveling wind intake structure for the saddled vehicle, in which a protrusion (31) convexly protruding downward is formed in a lower end portion (30d) of the wind screen (30), a lower end portion (41d) of the guide member (41) is formed to have a left-to-right width equal to a left-to-right width of the protrusion (31), and a recess (41e) which is convexly recessed upward is formed in the lower end portion (41d) of the guide member (41).

An eleventh aspect of the present invention provides the traveling wind intake structure for the saddled vehicle, in which a protrusion (31) convexly protruding downward is formed in a lower end portion (30d) of the wind screen (30), an opening (32) for introducing the traveling wind (W1)

rearward of the protrusion (31) is formed in the protrusion (31), and when the wind screen (30) is moved upward, an upper end (32a) of the opening (32) is located downward of a lower end (41b) of the guide member (41) in the side view.

According to the first aspect of the present invention, the leg members are each provided with the shaft portion extending along the vehicle width direction and supporting the louver member in a frontward and rearward swingable manner. Thereby, the louver member can be swung frontward and rearward in a space portion between the wind screen and the meter visor, and thus, upper and lower surfaces of the guide member can be utilized to change a travel direction of the traveling wind introduced through the introduction portion (or a direction in which the traveling wind flows). Thus, changing the travel direction of the traveling wind enables efficiently guiding the traveling wind toward a vehicle occupant adaptively to an occupant's riding position. Moreover, it is not necessary to form an inner wind passage within a vehicle body cover, and thus, a simple structure can be achieved. Therefore, the structure is simple in construction and capable of efficiently guiding the traveling wind toward the vehicle occupant. For example, when the louver member is swung frontward, the upper surface of the guide member can be utilized to guide the traveling wind in a first direction, or when the louver member is swung rearward, the lower surface of the guide member can be utilized to guide the traveling wind in a second direction downward of the first direction.

According to the second aspect of the present invention, the guide member includes the wing portion formed to extend toward the upstream side of the traveling wind introduced through the introduction portion in the side view. Thereby, the traveling wind flowing through the space between the wind screen and the meter visor can be rectified from the upstream side by the wing portion, and thus, the effect of deflecting the traveling wind toward the wind screen or the meter visor can be improved.

According to the third aspect of the present invention, the wing portion is formed by the first wing portion located upstream of the traveling wind relative to the shaft portion in the side view, and the second wing portion which is continuous with the first wing portion and is located downstream of the traveling wind relative to the shaft portion, and in the side view, the length of the second wing portion in the direction along the upper surface of the guide member is less than the length of the first wing portion in the direction. Thereby, movement of the second wing portion can be suppressed to be small with respect to a flow of the traveling wind, and a great overhang of the second wing portion toward the vehicle occupant can be suppressed.

According to the fourth aspect of the present invention, the guide member is formed by the first inclined portion which is inclined to extend upwardly rearward in the side view, and the second inclined portion which is continuous with the rear end of the first inclined portion and is inclined to extend rearward or downward of the first inclined portion in the side view. Thereby, the traveling wind flowing along the lower surface of the guide member can be guided rearward or downward.

According to the fifth aspect of the present invention, when the louver member swings rearward, the rear end of the second inclined portion is located rearward of the rear end of the meter visor in the side view, and the second inclined portion is inclined to extend downwardly rearward. Thereby, the traveling wind flowing along the lower surface of the guide member can be guided rearward of the meter and downward of the meter visor.

According to the sixth aspect of the present invention, the leg member is provided with the position restraining unit configured to restrain the relative positions of the guide member and the meter visor. Thereby, the guide member can be maintained at a fixed position with respect to the meter visor.

According to the seventh aspect of the present invention, when the louver member swings frontward, the position restraining unit restrains the relative positions such that the front end of the guide member is spaced from the upper surface of the meter visor. Thereby, contact of the guide member and the meter visor can be avoided, and thus, an interference noise can be prevented from being generated.

According to the eighth aspect of the present invention, the traveling wind intake structure further includes the position adjusting unit configured to allow the wind screen to move up and down and configured to adjust the relative positions of the lower end of the wind screen and the vehicle body. Thereby, the traveling wind introduced through the introduction portion can be increased and reduced.

According to the ninth aspect of the present invention, when the wind screen is moved upward, the lower end of the wind screen is located downward of the lower end of the guide member in the side view. Thereby, even if a foreign matter enters through the introduction portion, reaching of the foreign matter to the guide member can be suppressed. Moreover, the guide member can be reduced in weight, and thus, ease of operation of the louver member to swing frontward and rearward can be improved.

According to the tenth aspect of the present invention, the protrusion convexly protruding downward is formed in the lower end portion of the wind screen, and the recess which is convexly recessed upward is formed in the lower end portion of the guide member. Thereby, a long distance between the lower end portion of the wind screen and the lower end portion of the guide member can be ensured, and thus, the traveling wind introduced through the introduction portion can be guided long along the upper surface of the meter visor, and the louver member can effectively change the travel direction of the traveling wind (or the deflecting effect can be improved).

According to the eleventh aspect of the present invention, the opening for introducing the traveling wind rearward of the protrusion is formed in the protrusion, and when the wind screen is moved upward, the upper end of the opening is located downward of the lower end of the guide member in the side view. Thereby, even if a foreign matter enters through the opening, direct reaching of the foreign matter to the guide member can be suppressed. Moreover, the guide member can be reduced in weight, and thus, ease of operation of the louver member to swing frontward and rearward can be improved. Further, a constant traveling wind can be introduced through the opening, and a comfortable traveling wind can be guided toward the vehicle occupant.

DETAILED DESCRIPTION OF THE INVENTION

Figure 1:
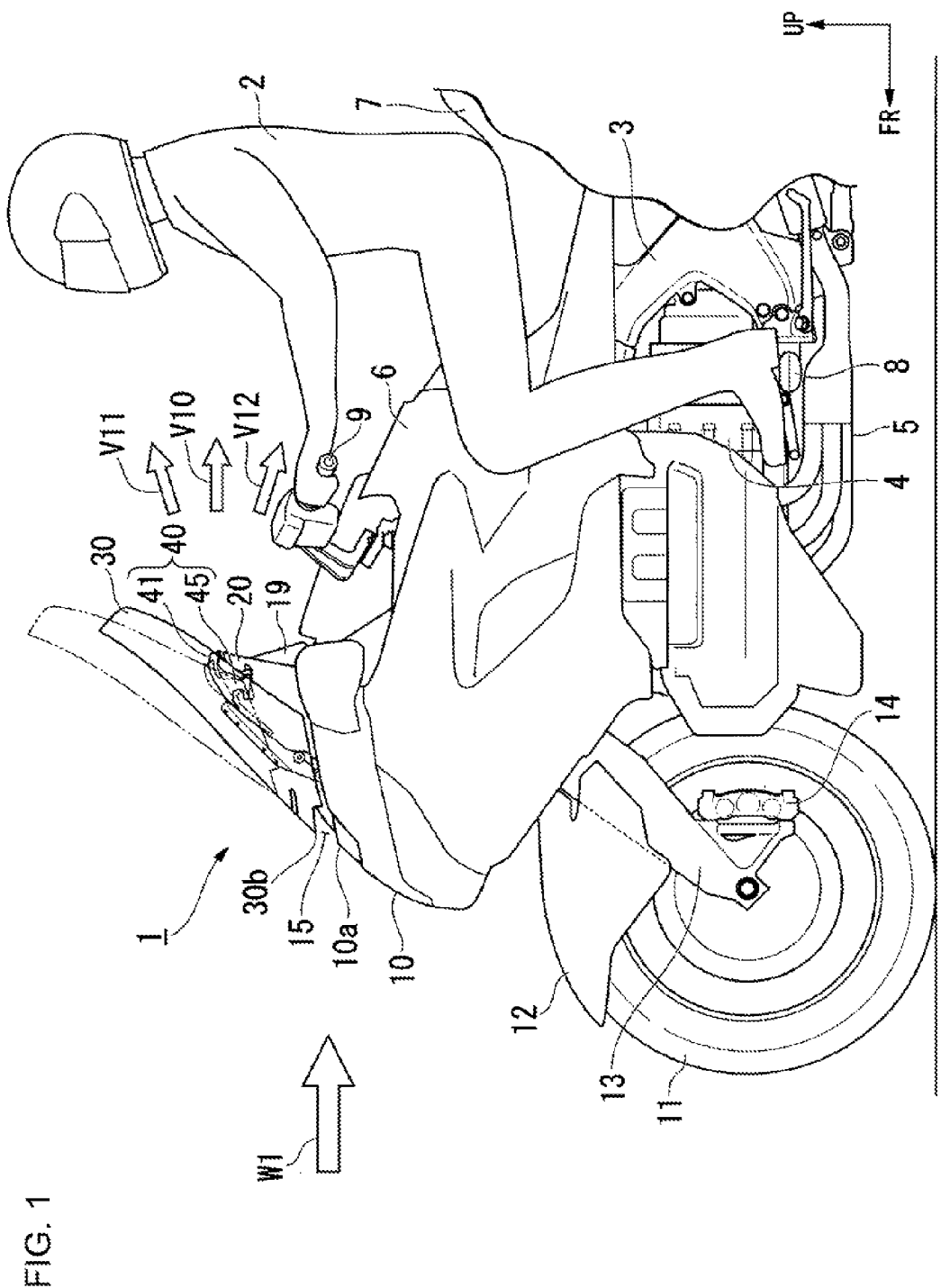
FIG. 1 is a left-side view illustrating a front portion of a vehicle body of a motorcycle according to an embodiment of the present invention, in conjunction with a vehicle occupant.

Embodiments of the present invention will be described below with reference to the drawings. Note that frontward, rearward, leftward, rightward and other directions in the following description are the same as those of a vehicle described below, unless otherwise specified. Moreover, an arrow FR indicating a vehicle frontward direction, an arrow LH indicating a vehicle leftward direction, and an arrow UP indicating a vehicle upward direction are given in appropriate portions in the drawings as used in the following description.

FIG. 1 illustrates a front portion of a vehicle body of a motorcycle as an example of a saddled vehicle. Referring to FIG. 1, the motorcycle has a traveling wind guide device 1 provided in a vehicle front portion and configured to guide a traveling wind W1 toward a vehicle occupant 2. The traveling wind guide device 1 is supported in a front portion of a vehicle body frame 3.

An engine 4 of a horizontally facing type, for example, is mounted below the vehicle body frame 3. An exhaust pipe 5 is connected to the engine 4. A fuel tank 6 and a seat 7 are disposed above the vehicle body frame 3. A step 8 on which the vehicle occupant 2 can put each of his or her feet is disposed in a lower portion of the vehicle body frame 3. A handlebar 9 having grip portions which the vehicle occupant 2 can grip is disposed above the fuel tank 6. The front portion of the vehicle body of the motorcycle is covered with a front cowl 10 (or the vehicle body) made of a synthetic resin.

In FIG. 1, reference numeral 11 denotes a front wheel; 12, a front fender; 13, a front fork; and 14, a brake caliper.

Figure 2:
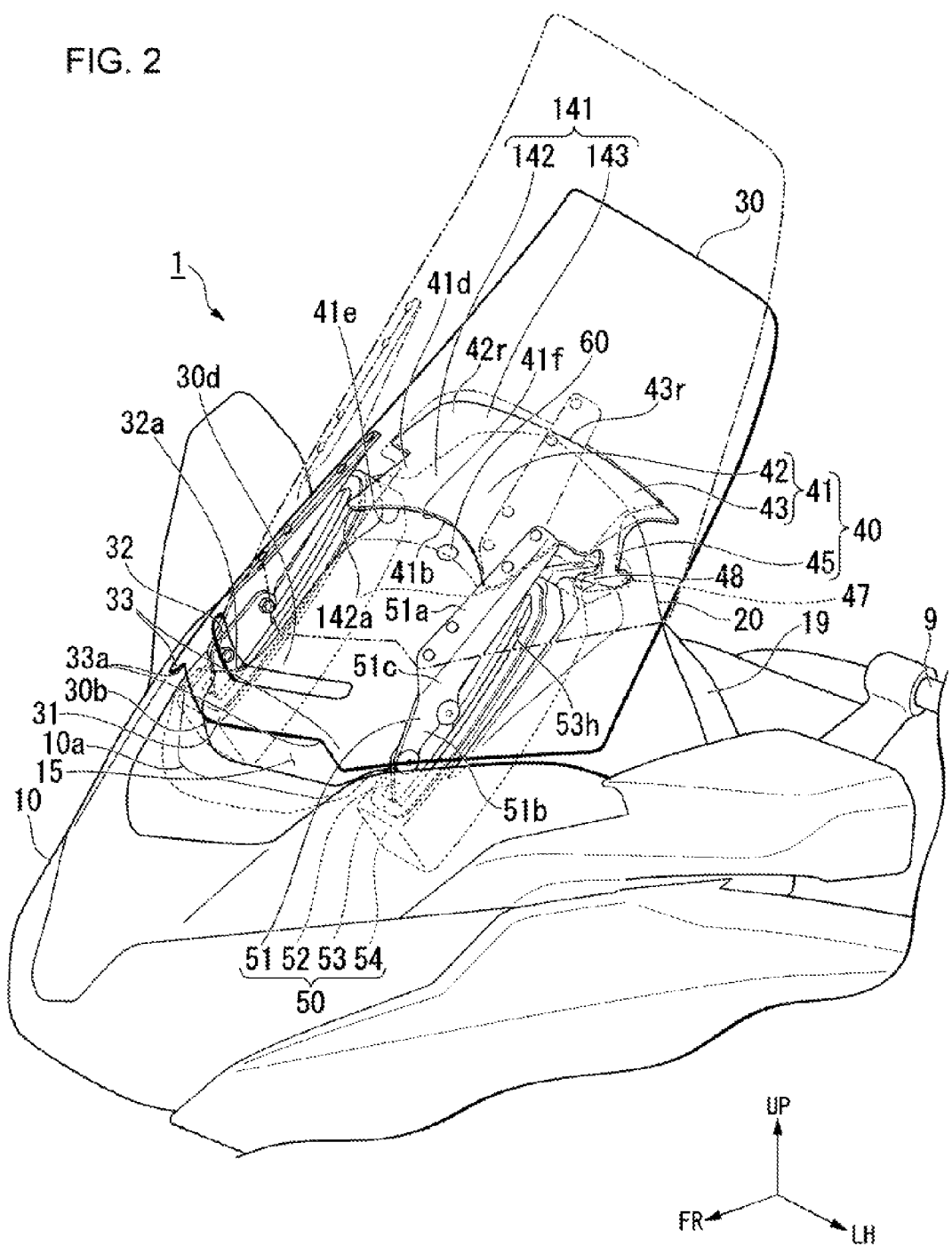
FIG. 2 is a perspective view of a traveling wind guide device of the motorcycle, as seen from the front at the upper left.
Figure 3:
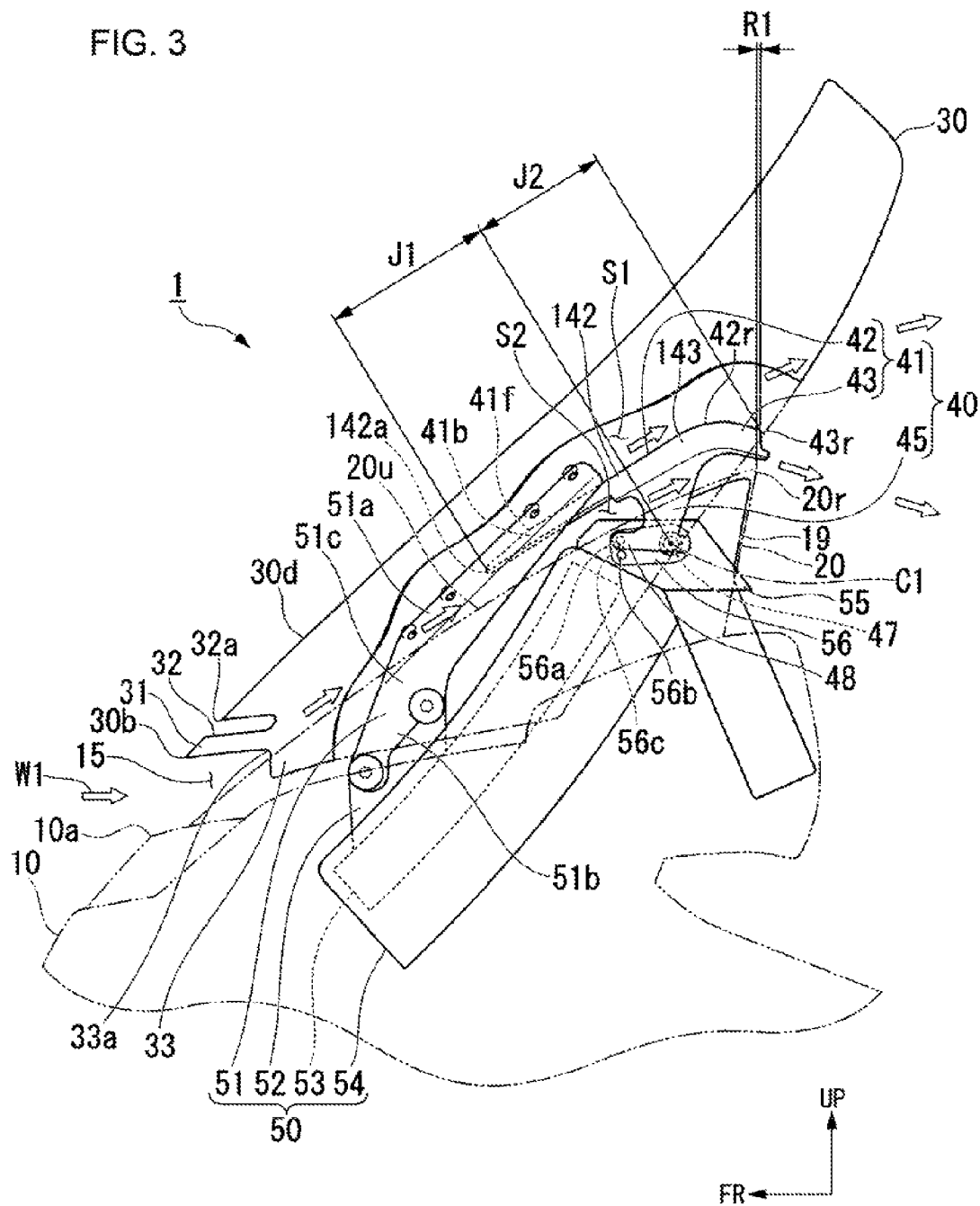
FIG. 3 is a view of assistance in explaining operation of the traveling wind guide device, and is a left-side view of the traveling wind guide device, with a wind screen moved downwardly frontward and a louver member swung downwardly rearward.

Referring to FIGS. 2 and 3 in conjunction, the traveling wind guide device 1 includes a meter visor 20 provided in the vehicle front portion and covering a meter 19 from above, and a wind screen 30 covering the meter visor 20 from above.

The meter visor 20 is made of, for example, a synthetic resin, and has a shape curved such that the meter visor 20 extends more downward toward outer sides in a vehicle width direction, and curved such that the meter visor 20 extends more upward toward a rear side in a side view (in detail, it is gently curved in a form convex upwardly frontward in the side view).

The wind screen 30 is made of, for example, a synthetic resin, and has a shape curved such that the wind screen 30 extends more downward toward outer sides in the vehicle width direction and curved such that the wind screen 30 extends more upward toward the rear side in the side view (in detail, its front lower portion is gently curved in a form convex upwardly frontward and its rear upper portion is gently curved in a form convex downwardly rearward in the side view).

A protrusion 31 convexly protruding downwardly frontward is formed in a lower end portion 30d of the wind screen 30. The protrusion 31 has a beak shape protruding downwardly frontward in the side view. A lower edge of the protrusion 31 has a V shape which is gently convexly curved downward in a front view.

An opening 32 for introducing the traveling wind W1 rearward of the protrusion 31 is formed in the protrusion 31. The opening 32 extends along the lower edge of the protrusion 31, and has a V shape which is gently convexly curved downward in the front view. A left-to-right width of the opening 32 has substantially the same dimension as that of the protrusion 31. An introduction portion 15 is formed downwardly frontward of the protrusion 31, and thus the left-to-right width of the protrusion 31 has substantially the same dimension as that of the introduction portion 15. Note that the left-to-right width of the protrusion 31 is substantially equal to a left-to-right distance of an inner end 33a of a left-to-right extending portion 33, to be described later, in the vehicle width direction.

The left-to-right extending portion 33 whose inner end 33a in the vehicle width direction is continuous with left and right side ends of the protrusion 31 and which extends downward from left and right side portions of the lower end portion 30d is formed in the lower end portion 30d of the wind screen 30. A lower edge of the left-to-right extending portion 33 is gently inclined to extend upwardly rearward in the side view. Note that the inner end 33a of the left-to-right extending portion 33 in the vehicle width direction corresponds to a boundary portion between the left-to-right extending portion 33 and the protrusion 31.

The introduction portion 15 for introducing the traveling wind W1 rearward of the wind screen 30 is formed between a lower end 30b of the wind screen 30 (in detail, a front lower end of the wind screen 30) and an upper end 10a of the front cowl 10 (in detail, a front upper end of the front cowl 10). A gate-type louver member 40 for guiding rearward the traveling wind W1 introduced through the introduction portion 15 and the opening 32 is provided between the wind screen 30 and the meter visor 20.

In the drawings, reference numeral S1 denotes a space (hereinafter called an "upper space") formed between an upper surface of the louver member 40 and a lower surface of the wind screen 30. In the drawings, reference numeral S2 denotes a space formed between a lower surface of the louver member 40 and an upper surface 20*u* of the meter visor 20, or equivalently, a space (hereinafter called a "lower space") surrounded by the gate-type louver member 40 and the upper surface 20*u* of the meter visor 20. The traveling wind W1 illustrated in FIG. 1 is introduced rearward of the wind screen 30 through the introduction portion 15 and the opening 32 and then flows through the upper space S1 and the lower space S2 toward the vehicle occupant 2.

A position adjusting unit 50 configured to allow the wind screen 30 to move up and down and configured to adjust the relative positions of the lower end 30*b* of the wind screen 30 and the upper end 10*a* of the front cowl 10 is provided below a front portion of the wind screen 30 and in left and right end portions of the meter visor 20.

The position adjusting unit 50 has a first supporting member 51 for supporting left and right side portions of the wind screen 30, a second supporting member 52 for supporting the first supporting member 51, a guide rail 53 for guiding the second supporting member 52 upwardly rearward or downwardly frontward, and an accommodating portion 54 for accommodating the guide rail 53.

The first supporting member 51 is formed by a screen supporting portion 51*a* being in the form of a plate having a thickness in a thickness direction of the wind screen 30, and inclined to extend upwardly rearward along the lower surface of the wind screen 30 in the side view, a connection portion 51*b* connected to the second supporting member 52, and a coupling portion 51*c* extending in an up-down direction between the screen supporting portion 51*a* and the connection portion 51*b*. The connection portion 51*b* and the coupling portion 51*c* are each in the form of a plate having a thickness in the vehicle width direction. The wind screen 30 is fixedly fastened to the left and right screen supporting portions 51*a* by plural fastening members (bolts and nuts) (for example, four for each of the left and right in the embodiment).

The second supporting member 52 supports the connection portion 51*b* extending in the up-down direction in the side view and located in a front lower end portion of the first supporting member 51. The connection portions 51*b* of the left and right first supporting members 51 are fixedly fastened to the left and right second supporting members 52 by plural fastening members (bolts and nuts) (for example, two for each of the left and right in the embodiment).

The guide rail 53 has a shape curved such that the guide rail 53 extends upwardly rearward in the side view (in detail, it is gently curved in a form convex downwardly rearward in the side view). A guide groove 53*h* into which a lower end portion of the second supporting member 52 is inserted is formed in the guide rail 53. The guide groove 53*h* is curved to extend upwardly rearward in the side view along a longitudinal direction of the guide rail 53.

The second supporting member 52 functions as a slider which is slidable upwardly rearward or downwardly frontward along the guide groove 53*h* of the guide rail 53. An actuator (not illustrated) including a motor or the like which allows the second supporting member 52 to slide is connected to the guide rail 53. Note that the handlebar 9 or the meter 19 or the like is provided with a switch (not illustrated) capable of activating the actuator.

For example, the switch is pushed thereby to allow the wind screen 30 to slide upwardly rearward or downwardly frontward.

Figure 4:
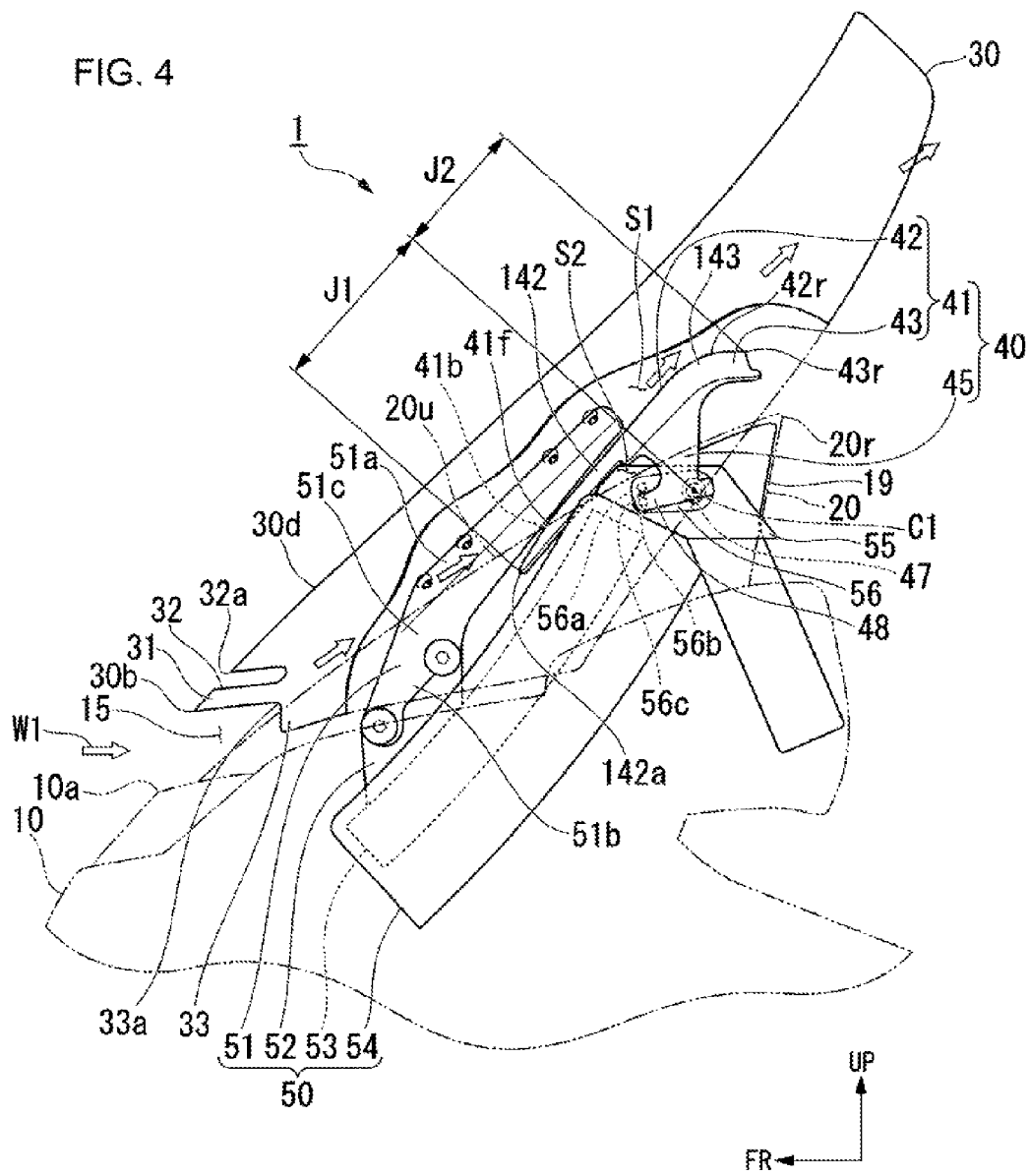
FIG. 4 is a view of assistance in explaining operation of the traveling wind guide device, and is a left-side view of the traveling wind guide device, with the wind screen moved downwardly frontward and the louver member swung downwardly frontward.

Referring to FIGS. 3 and 4, when the lower end 30*b* of the wind screen 30 is in close proximity to the upper end 10*a* of the front cowl 10, the position of the wind screen 30 is described as a "screen reference position." In the screen reference position, the wind screen 30 is in a position in which the wind screen 30 is moved most downwardly frontward (or downward) in a range movable up and down. In the screen reference position, an opening area of the introduction portion 15 is minimum. As employed herein, the "opening area" refers to an area of an opening portion of the introduction portion 15 in the front view.

Figure 5:
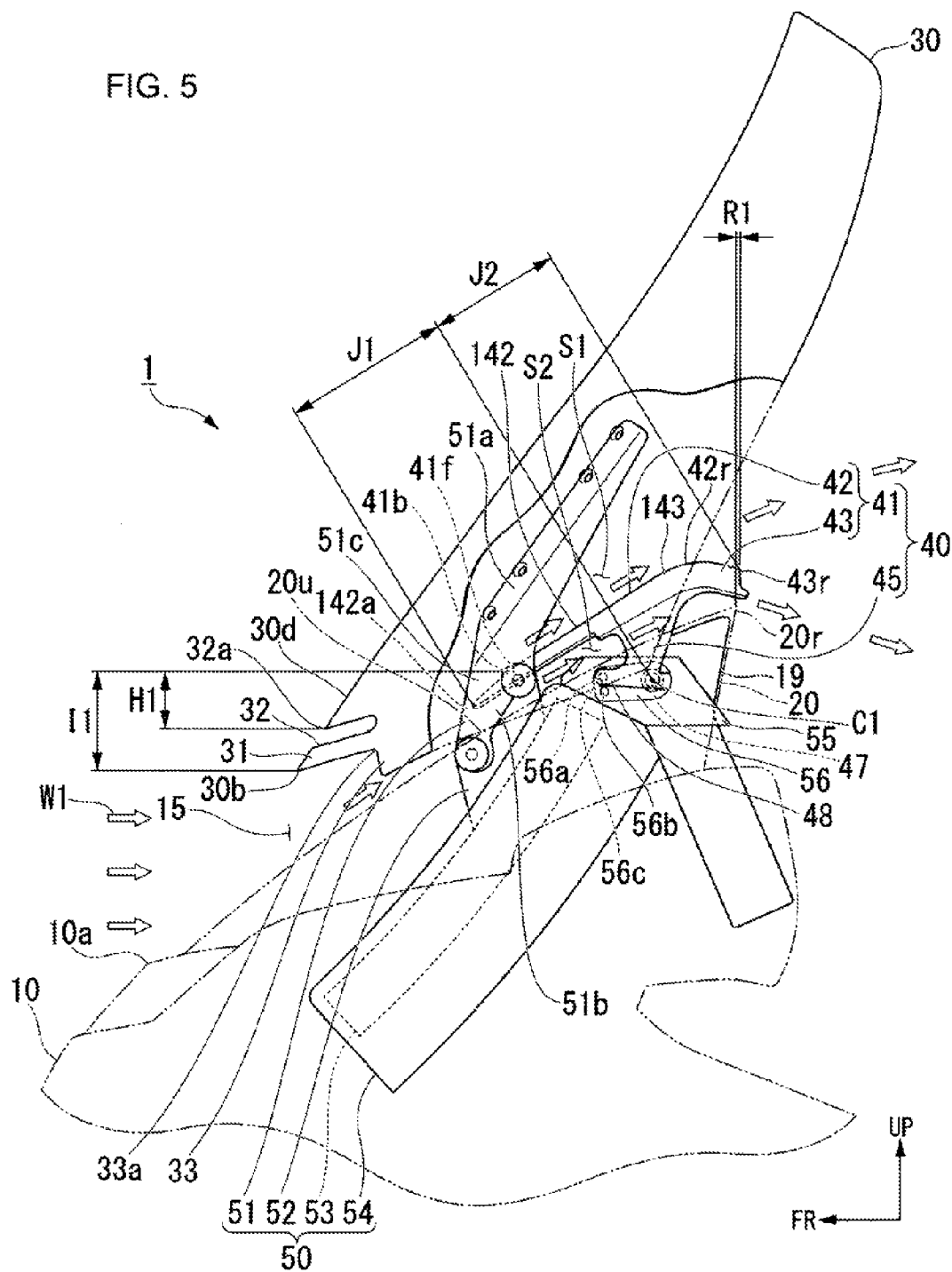
FIG. 5 is a view of assistance in explaining operation of the traveling wind guide device, and is a left-side view of the traveling wind guide device, with the wind screen moved upwardly rearward and the louver member swung downwardly rearward.
Figure 6:
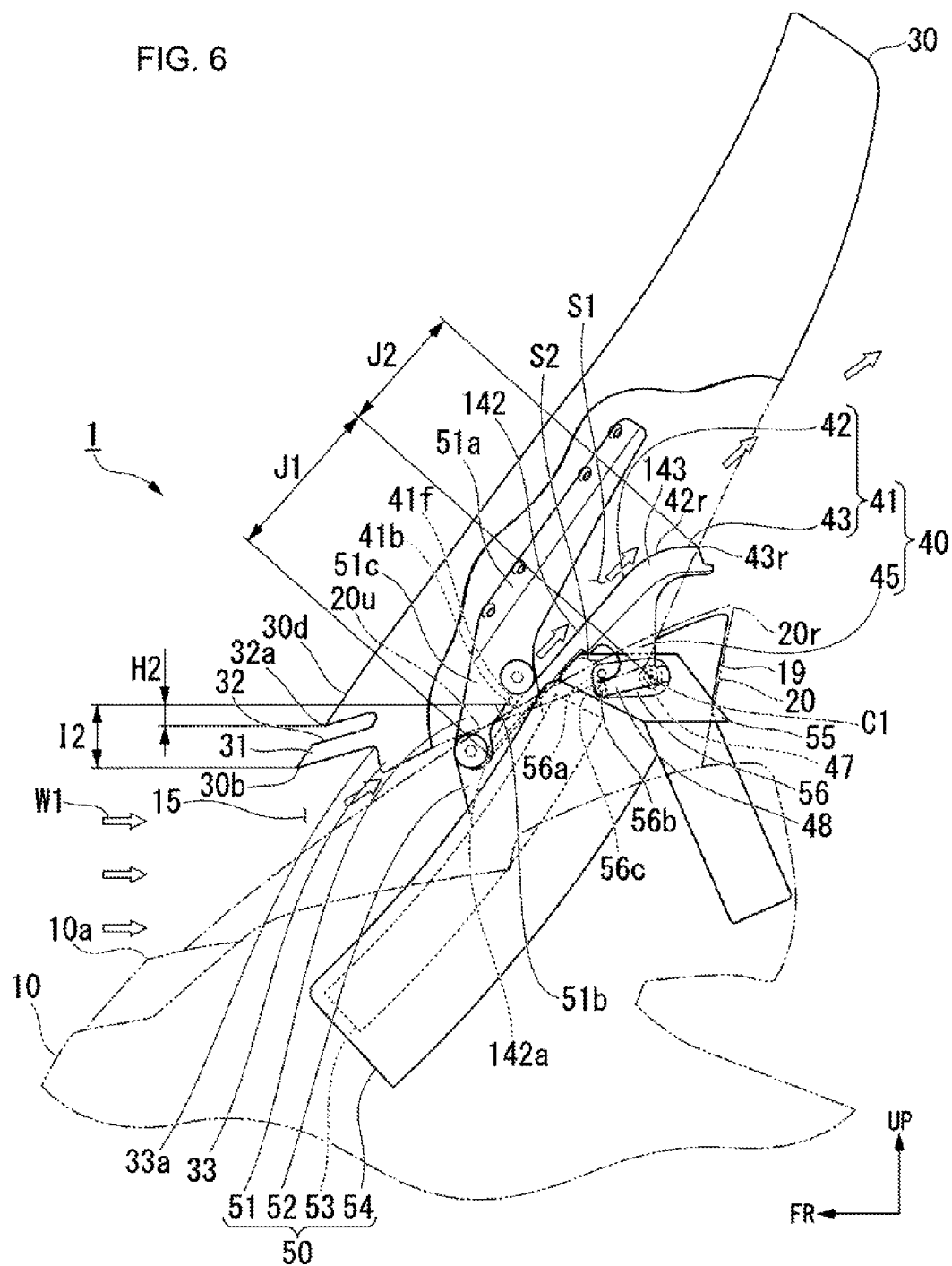
FIG. 6 is a view of assistance in explaining operation of the traveling wind guide device, and is a left-side view of the traveling wind guide device, with the wind screen moved upwardly rearward and the louver member swung downwardly frontward.

Referring to FIGS. 5 and 6, when the switch is pushed to one side, the wind screen 30 is moved upwardly rearward (or upward) relative to the screen reference position in the side view. Then, with respect to the screen reference position, the lower end 30*b* of the wind screen 30 is greatly spaced from the upper end 10*a* of the front cowl 10.

FIGS. 5 and 6 illustrate a position of the wind screen 30 in which the lower end 30*b* of the wind screen 30 is most greatly spaced from the upper end 10*a* of the front cowl 10, or equivalently, the position of the wind screen 30 moved most upwardly rearward (or upward) in the range movable up and down. The position of the wind screen 30 moved most upwardly rearward will hereinafter be described as a "screen upward-moved position." In the screen upward-moved position, the opening area of the introduction portion 15 is maximum.

In the screen upward-moved position, the lower end 30*b* of the wind screen 30 (specifically, a front lower end of the protrusion 31 at its center in the vehicle width direction, as illustrated in FIG. 2) is located downward of a lower end 41*b* of a guide member 41 (specifically, a lower end of a recess 41*e* at its center in the vehicle width direction, as illustrated in FIG. 2) in the side view. In FIGS. 5 and 6, reference numerals I1, I2 denote upper and lower gaps between the lower end 30*b* of the wind screen 30 and the lower end 41*b* of the guide member 41. Note that the gap I1 refers to a gap in a louver reference position to be described later, and the gap I2 refers to a gap in a louver frontward-swung position to be described later. The gap I2 in the louver frontward-swung position is smaller than the gap I1 in the louver reference position.

In the screen upward-moved position, an upper end 32*a* of the opening 32 (specifically, an upper end of the opening 32 at its center in the vehicle width direction, as illustrated in FIG. 2) is located downward of the lower end 41*b* of the guide member 41 (specifically, the lower end of the recess 41*e* at its center in the vehicle width direction, as illustrated in FIG. 2) in the side view. In FIGS. 5 and 6, reference numerals H1, H2 denote upper and lower gaps between the upper end 32*a* of the opening 32 and the lower end 41*b* of the guide member 41. Note that the gap H1 refers to a gap in the louver reference position to be described later, and the gap H2 refers to a gap in the louver frontward-swung position to be described later. The gap H2 in the louver frontward-swung position is smaller than the gap H1 in the louver reference position.

In the screen upward-moved position, when the switch is pushed to the other side, the wind screen 30 is moved downwardly frontward (or downward) toward the screen reference position in the side view, and the lower end 30*b* of the wind screen 30 comes into close proximity to the upper end 10*a* of the front cowl 10.

The louver member 40 is made of, for example, a synthetic resin, and is formed by the plate-shaped guide member 41 for guiding rearward the traveling wind W1 introduced through the introduction portion 15 and the opening 32, and a pair of left and right leg members 45 extending downward from left and right end portions of the guide member 41 in the vehicle width direction. For sake of convenience, the left leg member 45 of the left and right leg members 45 is illustrated in the drawings, and the right leg member 45 is omitted from the drawings.

Referring to FIG. 3 in conjunction, the guide member 41 is formed by a first inclined portion 42 which is inclined to extend upwardly rearward in the side view, and a second inclined portion 43 which is continuous with a rear end 42r of the first inclined portion 42 and is gently inclined downwardly rearward from the rear end 42r of the first inclined portion 42.

A lower end portion 41d (refer to FIG. 2) of the guide member 41 is formed to have a left-to-right width equal to that of the protrusion 31. The recess 41e which is convexly recessed upward is formed in the lower end portion 41d of the guide member 41. The recess 41e has an arcuate shape such that it is gently convexly curved upward in the front view.

The guide member 41 includes a wing portion 141 formed to extend toward an upstream side of the traveling wind W1 introduced through the introduction portion 15 in the side view. The wing portion 141 is formed by a first wing portion 142 located upstream of the traveling wind W1 relative to a shaft portion 47 to be described later in the side view, and a second wing portion 143 which is continuous with the first wing portion 142 and is located downstream of the traveling wind W1 relative to the shaft portion 47. In the side view, a length J2 of the second wing portion 143 in a direction along an upper surface of the guide member 41 is less than a length J1 of the first wing portion 142 in the above-mentioned direction. Note that the length J1 of the first wing portion 142 is described as a distance between a first axis C1 to be described later and a front end 142a of the first wing portion 142 in the above-mentioned direction in the side view (specifically, a front end of the first wing portion 142 in its left and right end portions, as illustrated in FIG. 2). Moreover, the length J2 of the second wing portion 143 is described as a distance between the first axis C1 in the above-mentioned direction in the side view and a rear end 43r of the second inclined portion 43 (specifically, a rear end of the second inclined portion 43 at its center in the vehicle width direction, as illustrated in FIG. 2).

Figure 7:
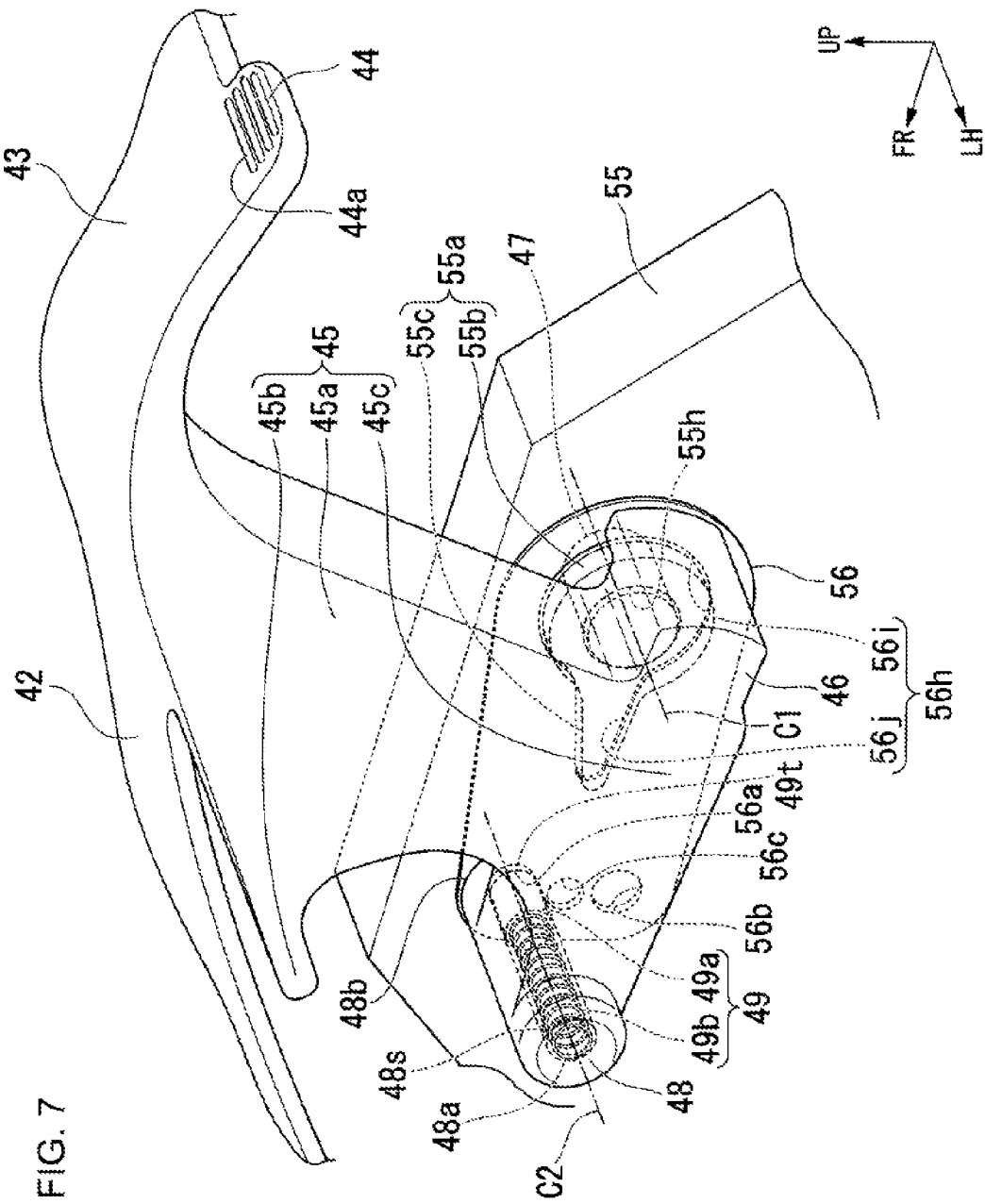
FIG. 7 is a view of assistance in explaining operation of a position restraining unit provided on a leg member of the louver member, and is a perspective view of the leg member as seen from the rear at the upper left, with the louver member swung downwardly rearward.

Referring to FIG. 7 in conjunction, the leg member 45 is formed by a wall portion 45a extending downward from the left and right end portions of the guide member 41 in the vehicle width direction, a coupling portion 45b extending between a front upper portion of the wall portion 45a and left and right rear ends of the first inclined portion 42, and an extending portion 45c extending frontward and rearward from a lower end portion of the wall portion 45a.

The wall portion 45a is formed to have a front-to-rear width that is greater at an upward position. The wall portion 45a and the extending portion 45c are each in the form of a plate having a thickness in the vehicle width direction, and each have a greater thickness than a thickness of the guide member 41. This improves supporting rigidity of the guide member 41.

The left and right leg members 45 are each provided with the shaft portion 47 extending along the vehicle width direction and supporting the louver member 40 in a frontward and rearward swingable manner. A rear supporting portion 46 for supporting the shaft portion 47 is formed in a rear end portion of the extending portion 45c of each of the left and right leg members 45. Rear end portions of the left and right rear supporting portions 46 are curved inward in the vehicle width direction to extend along an outer peripheral surface of a boss portion 55a to be described later. In the drawings, reference numeral C1 denotes a central axis of the shaft portion 47 (hereinafter called the "first axis").

Left and right end portions of a rear upper portion of the meter visor 20 are each provided with a supporting member 55 rotatably supporting the shaft portion 47. The left and right supporting members 55 each have the form of a plate having a trapezoidal shape in the side view and having a thickness in the vehicle width direction. The boss portion 55a protruding outwardly leftward and rightward in the vehicle width direction is formed on each of the left and right supporting members 55.

The boss portion 55a is formed by a cylindrical portion 55b of a cylindrical shape having the first axis C1 as the central axis in the side view, and a protrusion 55c which is continuous with a front end of the cylindrical portion 55b and protrudes frontward from the front end. A through-hole 55h opening in the vehicle width direction so as to form the central axis of the cylindrical portion 55b is formed in the cylindrical portion 55b.

The left and right shaft portions 47 extend from the rear supporting portions 46 inward in the vehicle width direction by a predetermined length. For example, the predetermined length (or a length of the shaft portion 47 in the vehicle width direction) has substantially the same dimension as the thickness of the supporting member 55 in the vehicle width direction (or a thickness obtained by adding together a thickness of a main body of the supporting member 55 and a thickness of the boss portion 55a (or a boss height)). The left and right shaft portions 47 are inserted into the through-holes 55h of the left and right supporting members 55, and thereby, the louver member 40 is supported by the supporting members 55 rotatably about the first axis C1.

A restraining member 56 for restraining the louver member 40 from rotating about the first axis C1 is provided between the left supporting member 55 and the left leg member 45. The restraining member 56 is not provided between the right supporting member 55 and the right leg member 45. Thus, a simpler structure can be achieved as compared to a case where the restraining members 56 are provided between the left and right supporting members 55 and the left and right leg members 45.

Note that a configuration may be such that the restraining member 56 is provided between the right supporting member 55 and the right leg member 45, and the restraining member 56 is not provided between the left supporting member 55 and the left leg member 45. Although a structure becomes complicated, the restraining members 56 may also be provided between the left and right supporting members 55 and the left and right leg members 45 from the viewpoint of stable restraint of rotation.

The restraining member 56 is in the form of a plate having a shape extending frontward and rearward in the side view and having a thickness less than that of the supporting member 55 in the vehicle width direction. A through-hole 56h opening in the vehicle width direction to have substantially the same shape as the boss portion 55a of the supporting member 55 in the side view is formed in the restraining member 56. The through-hole 56h is formed by a first through-hole 56i of a circular shape having the first axis C1 as the central axis in the side view, and a second through-hole 56j which is continuous with a front end of the first through-hole 56i and protrudes frontward from the front end.

The boss portion 55a is inserted into the through-hole 56h (in detail, the protrusion 55c is inserted into the second through-hole 56j), and thereby, the restraining member 56 is supported by the left supporting member 55 non-rotatably about the first axis C1. In other words, the restraining member 56 is restrained from rotating about the first axis C1, by the boss portion 55a of the left supporting member 55.

Plural through-holes 56a, 56b, 56c (for example, three through-holes in the embodiment) opening in the vehicle width direction, which are arranged in the up-down direction, are formed in a front end portion of the restraining member 56. The three through-holes 56a, 56b, 56c each have a circular shape in the side view, and the through-holes 56a, 56c, 56b are arranged in this order from an upward position toward a downward position. Hereinafter, the through-hole 56a among the three through-holes 56a, 56b, 56c will be described as an "upper through-hole 56a," the through-hole 56b located downward of the upper through-hole 56a in the side view will be described as a "lower through-hole 56b," and the through-hole 56c located between the upper and lower through-holes 56a, 56b in the side view will be described as an "intermediate through-hole 56c." An outer diameter of each of the upper and lower through-holes 56a, 56b is larger than an outer diameter of intermediate through-hole 56c.

The leg member 45 is provided with a position restraining unit 49 configured to restrain the relative positions of the guide member 41 and the meter visor 20. A front end portion of the extending portion 45c of the leg member 45 is provided with a front supporting portion 48 of a cylindrical shape for supporting the position restraining unit 49. The front supporting portion 48 protrudes in a round form convex outward in the vehicle width direction, at a position including the position restraining unit 49 in the side view.

The position restraining unit 49 is accommodated in an internal space 48s of the front supporting portion 48. The position restraining unit 49 has a shaft portion 49a having a central axis C2 (hereinafter called a "second axis") along a thickness direction of the restraining member 56 and having a tip end portion 49t protruding convexly spherically inward in the vehicle width direction, and a spring 49b which is connected at one end to an outer end of the shaft portion 49a in the vehicle width direction and is connected at the other end to an outer end 48a of an inner wall portion of the front supporting portion 48 in the vehicle width direction and can be extended and compressed in a direction along the second axis C2.

A length of the position restraining unit 49 (in detail, a length obtained by adding together a length of the shaft portion 49a in the direction along the second axis C2 and a length of the spring 49b) is a length such that the tip end portion 49t of the shaft portion 49a (an inner end portion in the vehicle width direction) extends, by a predetermined length, inward in the vehicle width direction, beyond an inner end of the front supporting 48 in the vehicle width direction.

For example, the predetermined length is set to a length such that the tip end portion 49t of the shaft portion 49a is inserted into any one of the through-holes 56a, 56b, 56c by a reaction force of the spring 49b, when the tip end portion 49t of the shaft portion 49a is in a position over any one of the through-holes 56a, 56b, 56c in the side view.

The tip end portion 49t of the shaft portion 49a is inserted into the through-hole by the reaction force of the spring 49b, and thereby, the louver member 40 is supported by the restraining member 56 non-rotatably about the first axis C1. In other words, the louver member 40 is restrained from rotating about the first axis C1, by engagement of any one of the through-holes 56a, 56b, 56c of the restraining member 56 with the tip end portion 49t of the shaft portion 49a.

As mentioned above, the tip end portion 49t of the shaft portion 49a is inserted into any one of the through-holes 56a, 56b, 56c, and thereby, the louver member 40 is held at a fixed position.

Referring to FIGS. 3, 5 and 7, in the embodiment, when the tip end portion 49t of the shaft portion 49a is inserted into the upper through-hole 56a, the position of the louver member 40 is described as the "louver reference position." In the louver reference position, the louver member 40 is in a position swung downwardly rearward (or rearward) in the side view.

Figure 8:
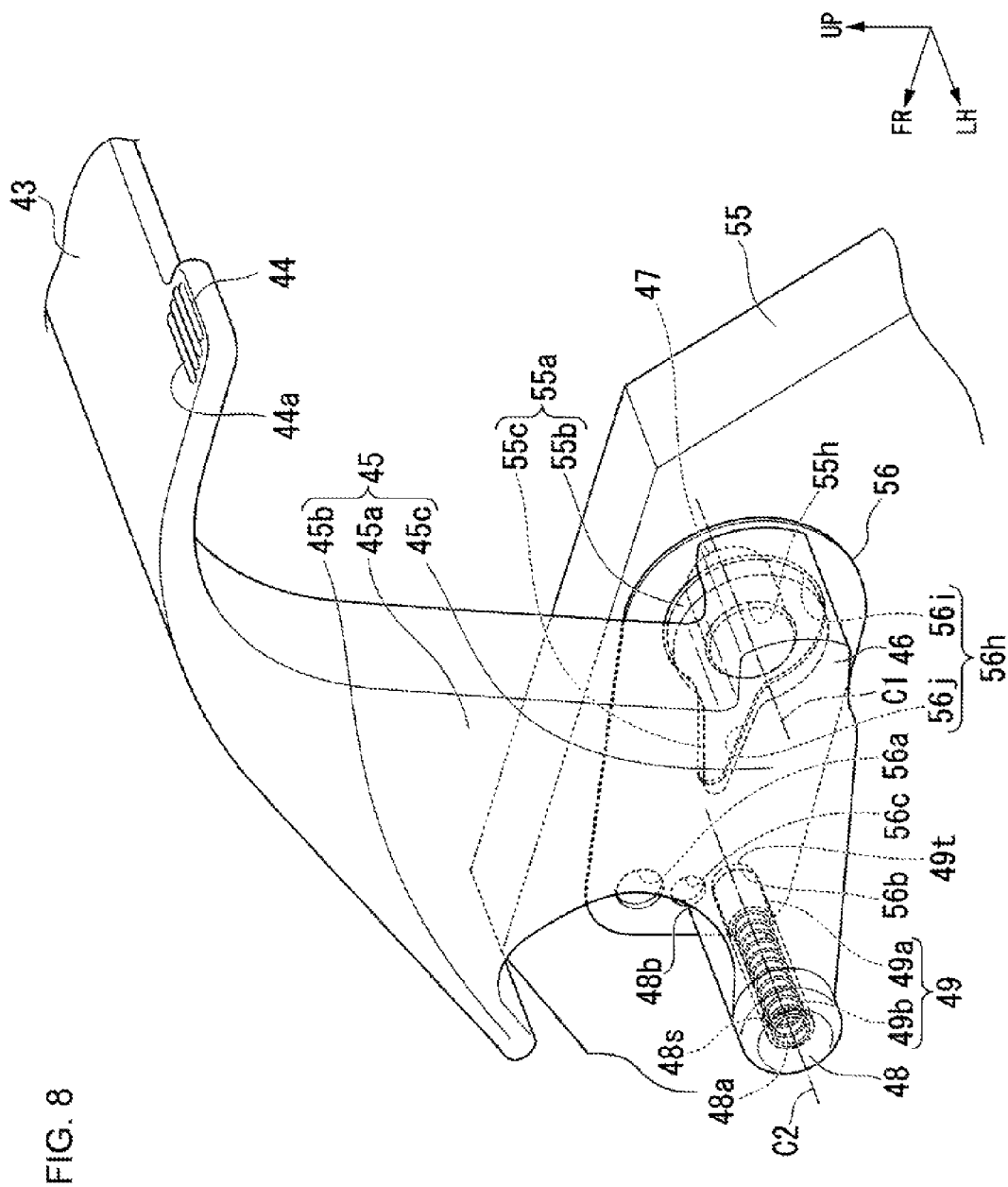
FIG. 8 is a view of assistance in explaining operation of the position restraining unit, and is a perspective view of the leg member as seen from the rear at the upper left, with the louver member swung downwardly frontward.

Referring to FIGS. 4, 6 and 8, when the tip end portion 49t of the shaft portion 49a is inserted into the lower through-hole 56b, the louver member 40 is in a position swung downwardly frontward (or frontward) of the louver reference position in the side view. Hereinafter, when the tip end portion 49t of the shaft portion 49a is inserted into the lower through-hole 56b, the position of the louver member 40 will be described as the "louver frontward-swung position."

In the embodiment, in the louver reference position, the louver member 40 is in a position swung most downwardly rearward in the side view, and in the louver frontward-swung position, the louver member 40 is in a position swung most downwardly frontward in the side view.

Although not illustrated in the drawings, when the tip end portion 49t of the shaft portion 49a is inserted into the intermediate through-hole 56c, the louver member 40 is in a position swung downwardly frontward (or frontward) of the louver reference position in the side view and swung upwardly rearward (or rearward) of the louver frontward-swung position. Hereinafter, when the tip end portion 49t of the shaft portion 49a is inserted into the intermediate through-hole 56c, the position of the louver member 40 will be described as a "louver intermediate position."

In the embodiment, the outer diameter of the upper and lower through-holes 56a, 56b is larger than the outer diameter of the intermediate through-hole 56c, and the shaft portion 49a has the tip end portion 49t protruding convexly spherically inward in the vehicle width direction. Thereby, in the louver reference position and the louver frontward-swung position, the tip end portion 49t of the shaft portion 49a is fitted deeper into the upper and lower through-holes 56a, 56b, as compared to the louver intermediate position, and thus, the position of the louver member 40 can be held with stability.

Referring to FIGS. 3 and 5 in conjunction, in the louver reference position, a rear end 43r of the second inclined portion 43 (specifically, a rear end of the second inclined portion 43 at its center in the vehicle width direction, as illustrated in FIG. 2) is located rearward of a rear end 20r of the meter visor 20 (specifically, a rear end of the meter visor 20 at its center in the vehicle width direction, as illustrated in FIG. 2) in the side view. In FIGS. 3 and 5, reference numeral R1 denotes a front-to-rear gap between the rear end 43r of the second inclined portion 43 and the rear end 20r of the meter visor 20. Moreover, in the louver reference position, the second inclined portion 43 is inclined to extend downwardly rearward.

Referring to FIGS. 4 and 6 in conjunction, in the louver frontward-swung position, the position restraining unit 49 restrains the relative positions of the guide member 41 and the meter visor 20 such that a front end 41f of the guide member 41 (specifically, a front end of the recess 41e at its center in the vehicle width direction, as illustrated in FIG. 2) is spaced from an upper surface 20u of the meter visor 20. In other words, even under a condition where the tip end portion 49t of the shaft portion 49a is fitted in the lower through-hole 56b as illustrated in FIG. 8, the front end 41f of the guide member 41 (specifically, the front end of the recess 41e at its center in the vehicle width direction, as illustrated in FIG. 2) and the upper surface 20u of the meter visor 20 do not abut each other.

Figure 9:
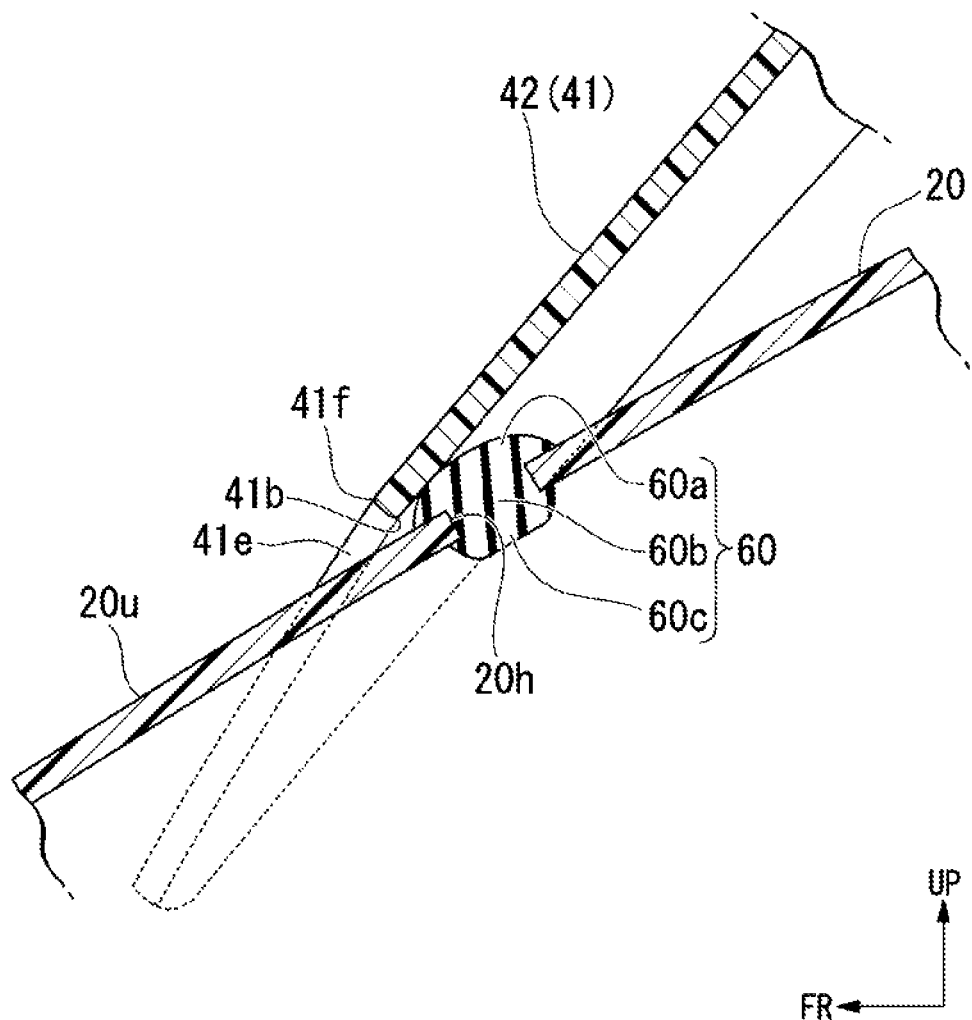
FIG. 9 is a view of assistance in explaining the relative positions of a guide member of the louver member and a meter visor, with the louver member swung downwardly frontward, and is a cross-sectional view of the guide member, the meter visor and a stopper, taken along a plane passing through a center of each member in a vehicle width direction.

Referring to FIG. 9 in conjunction, the meter visor 20 is provided with a stopper 60 capable of supporting the front end 41f of the guide member 41 (or a front end of the first inclined portion 42) in the louver frontward-swung position. The stopper 60 is made of an elastic member such as a rubber. The stopper 60 is formed by a supporting portion 60a which has a hemispherical shape convexly curved upwardly frontward in a sectional view and protrudes upward of the meter visor 20, a column portion 60b which is continuous with a lower end of the supporting portion 60a and is in the form of a cylindrical column, and a locking portion 60c which is continuous with a lower end of the column portion 60b and protrudes downward of the meter visor 20. For example, a through-hole 20h opening in the up-down direction is formed in the meter visor 20, and the stopper 60 is inserted into the through-hole 20h from the locking portion 60c side and thereby locked by the locking portion 60c thus to be detachably fixed to the meter visor 20. For sake of convenience, the stopper 60 is omitted from FIGS. 3 to 6.

Referring to FIG. 7 in conjunction, an extending portion 44 extending out rearward is integrally formed with the second inclined portion 43 in a left rear end portion of the second inclined portion 43 of the guide member 41. Plural ribs 44a (for example, four ribs in the embodiment) extending in the vehicle width direction are formed in an upper portion of the extending portion 44. For example, the extending portion 44 functions as a knob portion to grip the louver member 40 to manually adjust frontward and rearward swinging of the louver member 40. Note that the frontward and rearward swinging of the louver member 40 may be automatically adjusted.

Operation of the traveling wind guide device 1 will be described below with reference to FIGS. 3 to 6.

The traveling wind W1 illustrated in FIG. 1 is introduced rearward of the wind screen 30 through the introduction portion 15 and the opening 32 and then flows through the upper space S1 and the lower space S2 toward the vehicle occupant 2. In FIG. 1, reference numerals V10, V11, V12 schematically indicate directions in which the traveling wind introduced rearward of the wind screen 30 through the introduction portion 15 and the opening 32 flows through the upper space S1 and the lower space S2 and then toward the vehicle occupant 2. Among the directions V10, V11, V12, the direction V10 is a direction toward a chest of the vehicle occupant 2, the direction V11 is a direction toward a head of the vehicle occupant 2, and the direction V12 is a direction toward an abdomen of the vehicle occupant 2.

In the screen reference position illustrated in FIGS. 3 and 4, the opening area of the introduction portion 15 is minimum, and thus, the amount of the traveling wind W1 introduced through the introduction portion 15 is minimum, and the amount of the traveling wind toward the vehicle occupant 2 is also minimum.

In the screen upward-moved position illustrated in FIGS. 5 and 6, the opening area of the introduction portion 15 is maximum, and thus, the amount of the traveling wind W1 introduced through the introduction portion 15 is maximum, and the amount of the traveling wind toward the vehicle occupant 2 is also maximum.

Adjusting up and down movement of the wind screen 30 between the screen reference position and the screen upward-moved position enables appropriately increasing and reducing the traveling wind W1 introduced through the introduction portion 15, thus appropriately increasing and reducing the amount of the traveling wind toward the vehicle occupant 2.

Meanwhile, the opening area of the opening 32 is not changed by the up and down movement of the wind screen 30, and thus, in the screen reference position and the screen upward-moved position, the amount of the traveling wind W1 introduced through the opening 32 changes little.

In the louver reference position illustrated in FIGS. 3 and 5, the second inclined portion 43 is inclined to extend downwardly rearward, and thus, the traveling wind W1 illustrated in FIG. 1 is introduced rearward of the wind screen 30 through the introduction portion 15 and the opening 32 and then, when passing through the lower space S2, flows downwardly rearward along a lower surface of the guide member 41 (mainly, a lower surface of the second inclined portion 43) and changes its course to the direction V12 toward the abdomen of the vehicle occupant 2.

In the louver frontward-swung position, the second inclined portion 43 is substantially horizontal, and thus, the traveling wind W1 illustrated in FIG. 1 is introduced rearward of the wind screen 30 through the introduction portion 15 and the opening 32 and then, when passing through the lower space S2, flows substantially horizontally rearward along the lower surface of the guide member 41 (mainly, the lower surface of the second inclined portion 43) and changes its course to the direction V10 toward the chest of the vehicle occupant 2 in the second inclined portion 43.

Appropriate adjustment of the frontward and rearward swinging of the louver member 40 between the louver reference position and the louver frontward-swung position enables appropriately changing the directions V10, V11, V12 of the traveling wind flowing toward the vehicle occupant 2.

As described above, in the above-mentioned embodiment, there is provided the traveling wind intake structure for the saddled vehicle, including: the meter visor 20 provided in the vehicle front portion and covering the meter 19 from above; and the wind screen 30 covering the meter visor 20 from above, in which the introduction portion 15 for introducing the traveling wind W1 rearward of the wind screen 30 is formed between the lower end 30b of the wind screen 30 and the vehicle body 10, the gate-type louver member 40 is provided between the wind screen 30 and the meter visor 20, and is formed by the plate-shaped guide member 41 for guiding rearward the traveling wind W1 introduced through the introduction portion 15 and the opening 32, and the leg members 45 extending downward from left and right end portions of the guide member 41 in the vehicle width direction, and the leg members 45 are each provided with the shaft portion 47 extending along the vehicle width direction and supporting the louver member 40 in a frontward and rearward swingable manner.

According to this configuration, the leg members 45 are each provided with the shaft portion 47 extending along the vehicle width direction and supporting the louver member 40 in a frontward and rearward swingable manner. Thereby, the louver member 40 can be swung frontward and rearward in a space portion between the wind screen 30 and the meter visor 20, and thus, the upper and lower surfaces of the guide member 41 can be utilized to change a travel direction of the traveling wind W1 introduced through the introduction portion 15 and the opening 32 (or a direction in which the traveling wind W1 flows). Thus, changing the travel direction of the traveling wind W1 enables efficiently guiding the traveling wind toward the vehicle occupant 2 adaptively to a riding position of the vehicle occupant 2. Moreover, it is not necessary to form an inner wind passage within the vehicle body cover, and thus, a simple structure can be achieved. Therefore, the structure is simple in construction and is capable of efficiently guiding the traveling wind toward the vehicle occupant 2.

For example, when the louver member 40 is swung downwardly frontward (or frontward) (or is in the louver frontward-swung position), the upper surface of the guide member 41 can be utilized to guide the traveling wind W1 in a first direction (for example, the direction V11 toward the head of the vehicle occupant 2), or when the louver member 40 is swung downwardly rearward (or rearward) (or is in the louver reference position), the lower surface of the guide member 41 can be utilized to guide the traveling wind W1 in a second direction (for example, the direction V10 or V12 toward the chest or abdomen of the vehicle occupant 2) downward of the first direction.

Moreover, in the above-mentioned embodiment, the guide member 41 includes the wing portion 141 formed to extend toward the upstream side of the traveling wind W1 introduced through the introduction portion 15 in the side view. Thereby, the traveling wind flowing through the space between the wind screen 30 and the meter visor 20 can be rectified from the upstream side by the wing portion 141, and thus, the effect of deflecting the traveling wind toward the wind screen 30 or the meter visor 20 can be improved.

Moreover, in the above-mentioned embodiment, the wing portion 141 is formed by the first wing portion 142 located upstream of the traveling wind relative to the shaft portion 47 in the side view, and the second wing portion 143 which is continuous with the first wing portion 142 and is located downstream of the traveling wind relative to the shaft portion 47, and in the side view, the length J2 of the second wing portion 143 in the direction along the upper surface of the guide member 41 is less than the length J1 of the first wing portion 142 in the direction. Thereby, movement of the second wing portion 143 can be suppressed to be small with respect to a flow of the traveling wind, and a great overhang of the second wing portion 143 toward the vehicle occupant 2 can be suppressed.

Moreover, in the above-mentioned embodiment, the guide member 41 is formed by the first inclined portion 42 which is inclined to extend upwardly rearward in the side view, and the second inclined portion 43 which is continuous with the rear end 42r of the first inclined portion 42 and is inclined to extend rearward or downward of the first inclined portion 42. Thereby, the traveling wind flowing along the lower surface of the guide member 41 can be guided rearward or downward.

Moreover, in the above-mentioned embodiment, when the louver member 40 swings downwardly rearward (or is in the louver reference position), the rear end 43r of the second inclined portion 43 is located rearward of the rear end 20r of the meter visor 20 in the side view, and the second inclined portion 43 is inclined to extend downwardly rearward. Thereby, the traveling wind flowing along the lower surface of the guide member 41 can be guided rearward of the meter 19 and downward of the meter visor 20.

Moreover, in the above-mentioned embodiment, the leg member 45 is provided with the position restraining unit (49) configured to restrain the relative positions of the guide member 41 and the meter visor 20. Thereby, the guide member 41 can be maintained at a fixed position with respect to the meter visor 20. Specifically, the tip end portion 491 of the shaft portion 49a is inserted into any one of the through-holes 56a, 56b, 56c, and thereby, the position of the guide member 41 can be held.

Moreover, in the above-mentioned embodiment, when the louver member 40 swings downwardly frontward (or is in the louver frontward-swung position), the position restraining unit 49 restrains the relative positions such that the front end 41f of the guide member 41 is spaced from the upper surface 20u of the meter visor 20. Thereby, contact of the guide member 41 and the meter visor 20 can be avoided, and thus, an interference noise can be prevented from being generated.

Further, in the above-mentioned embodiment, the meter visor 20 is provided with the stopper 60 capable of supporting the front end 41f of the guide member 41 (or the front end of the first inclined portion 42) in the louver frontward-swung position. Thereby, contact of the guide member 41 and the meter visor 20 can be effectively avoided, and thus, an interference noise can be effectively prevented from being generated.

Moreover, in the above-mentioned embodiment, the traveling wind intake structure further includes the position adjusting unit 50 configured to allow the wind screen 30 to move up and down and configured to adjust the relative positions of the lower end 30b of the wind screen 30 and the front cowl 10. Thereby, the traveling wind W1 introduced through the introduction portion 15 can be increased and reduced.

Moreover, in the above-mentioned embodiment, when the wind screen 30 is moved upward (or is in the screen upward-moved position), the lower end 30b of the wind screen 30 is located downward of the lower end 41b of the guide member 41 in the side view. Thereby, even if a foreign matter enters through the introduction portion 15, reaching of the foreign matter to the guide member 41 can be suppressed. Moreover, the guide member 41 can be reduced in weight, and thus, ease of operation of the louver member 40 to swing frontward and rearward can be improved.

Moreover, in the above-mentioned embodiment, the protrusion 31 convexly protruding downward is formed in the lower end portion 30d of the wind screen 30, the lower end portion 41d of the guide member 41 is formed such that its left-to-right width is the same as that of the protrusion 31, and the recess 41e which is convexly recessed upward is formed in the lower end portion 41d of the guide member 41. Thereby, a long distance between the lower end portion 30b of the wind screen 30 and the lower end portion 41b of the guide member 41 can be ensured, and thus, the traveling wind W1 introduced through the introduction portion 15 can be guided long along the upper surface 20u of the meter visor 20, and the louver member 40 can effectively change the travel direction of the traveling wind W1 (or the deflecting effect can be improved).

Moreover, in the above-mentioned embodiment, the opening (32) for introducing the traveling wind W1 rearward of the protrusion 31 is formed in the protrusion 31, and when the wind screen 30 is moved upward (or is the screen upward-moved position), the upper end 32a of the opening 32 is located downward of the lower end 41b of the guide member 41 in the side view. Thereby, even if a foreign matter enters through the opening 32, direct reaching of the foreign matter to the guide member 41 can be suppressed. Moreover, the guide member 41 can be reduced in weight, and thus, ease of operation of the louver member 40 to swing frontward and rearward can be improved. Further, a constant traveling wind W1 can be introduced through the opening 32, and a comfortable traveling wind can be guided toward the vehicle occupant 2.

In the above-mentioned embodiment, when the lower end 30b of the wind screen 30 is in close proximity to the front cowl 10, the position of the wind screen 30 is described as the "screen reference position," and the position in which the wind screen 30 is moved most upwardly rearward is described as the "screen upward-moved position." However, the present invention is not so limited. For example, when the lower end 30b of the wind screen 30 is greatly spaced from the front cowl 10, the position of the wind screen 30 may be set as the "screen reference position," and a position in which the wind screen 30 is moved most downwardly frontward may be set as a "screen downward-moved position."

Moreover, in the above-mentioned embodiment, when the tip end portion 49t of the shaft portion 49a is inserted into the upper through-hole 56a, the position of the louver member 40 is described as the "louver reference position." and when the tip end portion 49t of the shaft portion 49a is inserted into the lower through-hole 56b, the position of the louver member 40 is described as the "louver frontward-swung position." However, the present invention is not so limited. For example, when the tip end portion 49t of the shaft portion 49a is inserted into the lower through-hole 56b, the position of the louver member 40 may be set as the "louver reference position," and when the tip end portion 49t of the shaft portion 49a is inserted into the upper through-hole 56a, the position of the louver member 40 may be set as a "louver rearward-swung position."

Moreover, when the tip end portion 49t of the shaft portion 49a is inserted into the intermediate through-hole 56c, the position of the louver member 40 may be set as the "louver reference position," when the tip end portion 49t of the shaft portion 49a is inserted into the lower through-hole 56b, the position of the louver member 40 may be set as the "louver frontward-swung position," and when the tip end portion 49t of the shaft portion 49a is inserted into the upper through-hole 56a, the position of the louver member 40 may be set as a "louver rearward-swung position."

Moreover, in the above-mentioned embodiment, description has been given, giving an example in which the opening 32 is formed in the protrusion 31; however, the opening 32 may not be formed in the protrusion 31. In this case, the traveling wind W1 illustrated in FIG. 1 is introduced rearward of the wind screen 30 through the introduction portion 15 and then flows through the upper space S1 and the lower space S2 toward the vehicle occupant 2.

The present invention is not limited to the above-mentioned embodiment, and for example, the saddled vehicles include vehicles in general which a driver sits astride the vehicle body to ride, and include not only the motorcycles (including a motorized bicycle and a scooter type vehicle) but also three-wheeled vehicles (including a vehicle with two front wheels and one rear wheel, as well as a vehicle with one front wheel and two rear wheels).

Moreover, the present invention may be applied to a vehicle mounted with a vertically arranged engine besides the engine of the horizontally facing type, or a vehicle mounted with a horizontally arranged engine in which a crankshaft extends along the vehicle width direction.

A configuration of the above-mentioned embodiment is an example of the present invention, and various changes, such as replacement of structural elements of the embodiment with well-known structural elements, may be made without departing from the scope of the present invention.

The invention claimed is:

1. A traveling wind intake structure for a saddled vehicle, comprising:
 a meter visor provided in a vehicle front portion and covering a meter from above; and
 a wind screen covering the meter visor from above,
 wherein an introduction portion for introducing a traveling wind rearward of the wind screen is formed between a lower end of the wind screen and a vehicle body,
 a gate-type louver member is provided between the wind screen and the meter visor, and is formed by a plate-shaped guide member for guiding rearward the traveling wind introduced through the introduction portion, and leg members extending downward from left and right end portions of the guide member in a vehicle width direction, and
 the leg members are each provided with a shaft portion extending along the vehicle width direction and supporting the louver member in a frontward and rearward swingable manner.

2. The traveling wind intake structure for a saddled vehicle according to claim 1, wherein the guide member comprises a wing portion formed to extend toward an upstream side of the traveling wind introduced through the introduction portion in a side view.

3. The traveling wind intake structure for a saddled vehicle according to claim 2, wherein the wing portion is formed by a first wing portion located upstream of the traveling wind relative to the shaft portion in the side view, and a second wing portion which is continuous with the first wing portion and is located downstream of the traveling wind relative to the shaft portion in the side view, and
 in the side view, a length of the second wing portion in a direction along an upper surface of the guide member is less than a length of the first wing portion in the direction.

4. The traveling wind intake structure for a saddled vehicle according to claim 1, wherein the guide member is formed by a first inclined portion which is inclined to extend upwardly rearward in a side view, and a second inclined portion which is continuous with a rear end of the first inclined portion and is inclined to extend rearward or downward of the first inclined portion in the side view.

5. The traveling wind intake structure for a saddled vehicle according to claim 4, wherein when the louver member swings rearward, a rear end of the second inclined portion is located rearward of a rear end of the meter visor, and the second inclined portion is inclined to extend downwardly rearward in the side view.

6. The traveling wind intake structure for a saddled vehicle according to claim 1, wherein the leg member is provided with a position restraining unit configured to restrain relative positions of the guide member and the meter visor.

7. The traveling wind intake structure for a saddled vehicle according to claim 6, wherein when the louver member swings frontward, the position restraining unit restrains the relative positions such that a front end of the guide member is spaced from an upper surface of the meter visor.

8. The traveling wind intake structure for a saddled vehicle according to claim 1, further comprising a position adjusting unit configured to allow the wind screen to move up and down and configured to adjust the relative positions of the lower end of the wind screen and the vehicle body.

9. The traveling wind intake structure for a saddled vehicle according to claim 8, wherein when the wind screen is moved upward, the lower end of the wind screen is located downward of a lower end of the guide member in a side view.

10. The traveling wind intake structure for a saddled vehicle according to claim 1, wherein
 a protrusion convexly protruding downward is formed in a lower end portion of the wind screen,
 a lower end portion of the guide member is formed to have a left-to-right width equal to a left-to-right width of the protrusion, and
 a recess which is convexly recessed upward is formed in the lower end portion of the guide member.

11. The traveling wind intake structure for a saddled vehicle according to claim 10, wherein
 the protrusion convexly protruding downward is formed in a lower end portion of the wind screen,
 an opening for introducing the traveling wind rearward of the protrusion is formed in the protrusion, and
 when the wind screen is moved upward, an upper end of the opening is located downward of a lower end of the guide member in a side view.

\* \* \* \* \*